(12) United States Patent
Gilardo et al.

(10) Patent No.: US 11,135,491 B2
(45) Date of Patent: Oct. 5, 2021

(54) SYSTEM FOR TRAINING BASEBALL CATCHERS

(71) Applicants: Peter Gilardo, Wilmington, NC (US); David Greenslade, Southington, CT (US)

(72) Inventors: Peter Gilardo, Wilmington, NC (US); David Greenslade, Southington, CT (US)

( * ) Notice: Subject to any disclaimer, the term of this patent is extended or adjusted under 35 U.S.C. 154(b) by 61 days.

(21) Appl. No.: 15/334,980

(22) Filed: Oct. 26, 2016

(65) Prior Publication Data

US 2017/0113115 A1 Apr. 27, 2017

Related U.S. Application Data

(60) Provisional application No. 62/246,150, filed on Oct. 26, 2015.

(51) Int. Cl.
*A63B 69/00* (2006.01)
*G09B 19/00* (2006.01)

(52) U.S. Cl.
CPC ...... *A63B 69/0002* (2013.01); *G09B 19/0038* (2013.01); *A63B 2069/0011* (2013.01)

(58) Field of Classification Search
CPC .. G09B 19/0038; A63D 7/00; A63B 69/0002; A63B 69/0059; A63B 69/0079; A63B 69/0048; A63B 2069/0006; A63B 2069/0011; A63B 21/0552
See application file for complete search history.

(56) References Cited

U.S. PATENT DOCUMENTS

| | | | | |
|---|---|---|---|---|
| 712,877 A | * | 11/1902 | White | B60T 13/665 303/26 |
| 3,099,261 A | * | 7/1963 | Doss | B64G 6/00 600/19 |
| 3,117,781 A | * | 1/1964 | Vargo | A63B 21/0023 482/91 |
| 3,148,375 A | * | 9/1964 | Jones | A42B 3/0473 2/421 |
| 3,329,464 A | * | 7/1967 | Barwood | A42B 3/22 297/465 |

(Continued)

*Primary Examiner* — Melba Bumgarner
*Assistant Examiner* — Amir A Klayman
(74) *Attorney, Agent, or Firm* — Smith Tempel Blaha LLC; Matthew T. Hoots

(57) ABSTRACT

A system for teaching a catcher the proper form for the traditional blocking position comprising a wrist strap, a wrist-to-facemask adjustable tether, a retractable tether, an automatic tether retraction system, a release trigger system, and a leg attachment component. The wrist-to-facemask adjustable tether is detachably engaged to the wrist strap as is the retractable tether. The automatic tether retraction system is mechanically engaged to the retractable tether, and is configured to automatically retract and spool the retractable tether. The release trigger system is mechanically engaged to the retractable tether, and is configured to, at least in part, lock and prevent any extension of the spooled retractable tether. The retractable tether in conjunction with the release trigger system is configured to restrict the distance the wrist strap may range from the leg attachment component, while the wrist-to-facemask adjustable tether is configured to restrict the distance the facemask may range from the wrist strap.

10 Claims, 12 Drawing Sheets

(56) References Cited

U.S. PATENT DOCUMENTS

| | | | |
|---|---|---|---|
| 3,577,977 A * | 5/1971 | Ritzinger, Jr. | B64D 10/00 600/20 |
| 3,804,420 A * | 4/1974 | Boyd | A63B 69/0059 273/DIG. 21 |
| 3,970,316 A * | 7/1976 | Westmoreland, Jr. | A63B 69/0059 473/212 |
| 4,746,118 A * | 5/1988 | Deveney | A63B 69/0002 473/208 |
| 5,118,104 A * | 6/1992 | DeLanzo | A63B 69/0002 273/DIG. 17 |
| 5,137,272 A * | 8/1992 | Wilkinson | A63B 21/0004 482/124 |
| 5,141,482 A * | 8/1992 | Hern | A63B 21/0552 482/130 |
| 5,154,416 A * | 10/1992 | Smull | A63B 69/0059 473/458 |
| 5,186,701 A * | 2/1993 | Wilkinson | A41D 13/0015 482/121 |
| 5,272,770 A * | 12/1993 | Allen | A42B 3/0473 2/421 |
| 5,336,151 A * | 8/1994 | Van Ballegooie | A63B 21/00185 482/121 |
| 5,372,565 A * | 12/1994 | Burdenko | A63B 21/0552 482/124 |
| 5,507,707 A * | 4/1996 | Miller | A63B 21/0004 482/10 |
| 5,509,873 A * | 4/1996 | Corn | A63B 21/153 482/124 |
| 5,586,962 A * | 12/1996 | Hallmark | A63B 21/04 482/123 |
| 5,647,827 A * | 7/1997 | Gutkowski | A63B 21/0004 482/122 |
| 5,704,856 A * | 1/1998 | Morse | A63B 21/0004 473/212 |
| 5,807,218 A * | 9/1998 | Nagatomo | A61F 5/3715 128/869 |
| 6,368,262 B1 * | 4/2002 | Willoughby | A01K 15/04 119/796 |
| 7,137,935 B2 * | 11/2006 | Clarke | A63B 21/00043 482/123 |
| 7,147,590 B2 * | 12/2006 | Toven | A63B 69/0028 482/51 |
| 7,172,522 B1 * | 2/2007 | Harvey | A63B 69/0059 473/450 |
| 7,402,147 B1 * | 7/2008 | Allen | A61F 5/373 602/19 |
| 7,563,212 B2 * | 7/2009 | Smith | A63B 21/025 482/124 |
| 7,637,853 B2 * | 12/2009 | Crowson | A63B 21/00 482/127 |
| 7,758,436 B2 * | 7/2010 | Reynolds | A63B 69/0057 473/207 |
| 7,985,144 B1 * | 7/2011 | Gonzales | A41D 13/0015 2/93 |
| 8,052,548 B1 * | 11/2011 | Stanisic | A63B 69/0059 473/464 |
| 8,201,277 B2 * | 6/2012 | Olivarez | A42B 3/0473 2/421 |
| 8,303,473 B2 * | 11/2012 | Gutierrez | A63B 21/00 482/121 |
| 8,784,285 B1 * | 7/2014 | Lopez | A63B 21/0555 482/121 |
| 8,833,310 B2 * | 9/2014 | Konigsberg | A01K 27/00 119/770 |
| 9,446,295 B2 * | 9/2016 | Matte | A63B 69/0048 |
| 9,687,716 B2 * | 6/2017 | George | A63B 21/0552 |
| 9,700,751 B2 * | 7/2017 | Verdi | A63B 21/4019 |
| 9,802,095 B1 * | 10/2017 | Boyer | A63B 69/0059 |
| 9,833,677 B2 * | 12/2017 | Ross | A63B 69/0002 |
| 10,127,828 B2 * | 11/2018 | Arnold | A63B 21/00185 |
| 2004/0018922 A1 * | 1/2004 | Maiuri | A63B 21/4025 482/124 |
| 2004/0068779 A1 * | 4/2004 | Duffy | A42B 3/0473 2/422 |
| 2004/0097296 A1 * | 5/2004 | Snyder | A63B 69/3608 473/212 |
| 2004/0237907 A1 * | 12/2004 | Muller | A01K 27/004 119/796 |
| 2005/0107226 A1 * | 5/2005 | Monda | A63B 21/00 482/121 |
| 2006/0178224 A1 * | 8/2006 | DuFour | A63B 69/3608 473/276 |
| 2007/0083987 A1 * | 4/2007 | Mothaffar | A42B 3/0473 2/468 |
| 2007/0135277 A1 * | 6/2007 | Alessandri | A63B 21/00072 482/121 |
| 2008/0042000 A1 * | 2/2008 | Horton | A01K 27/004 242/382 |
| 2008/0182678 A1 * | 7/2008 | Brooks | A63B 69/3647 473/224 |
| 2008/0214330 A1 * | 9/2008 | Goebel | A63B 21/0004 473/438 |
| 2011/0130253 A1 * | 6/2011 | Fuller | A63B 21/169 482/122 |
| 2013/0210559 A1 * | 8/2013 | Ruvoli | A63B 69/0059 473/458 |
| 2013/0303344 A1 * | 11/2013 | Rasnake | A63B 21/02 482/124 |
| 2014/0053324 A1 * | 2/2014 | Jackson | A42B 3/0473 2/425 |
| 2015/0251038 A1 * | 9/2015 | Bybee | A63B 21/4009 482/124 |
| 2017/0127483 A1 * | 5/2017 | Chiang | H05B 33/086 |
| 2017/0157483 A1 * | 6/2017 | Wilber | A63B 69/0002 |
| 2019/0269988 A1 * | 9/2019 | Michalek | A63B 69/0059 |
| 2019/0281902 A1 * | 9/2019 | Nabors | A41D 19/0024 |

* cited by examiner

SYSTEM FOR TRAINING BASEBALL CATCHERS

CROSS-REFERENCE TO RELATED APPLICATIONS

This application claims priority under 35 U.S.C. 119(e) to U.S. provisional application entitled "SYSTEM FOR TRAINING BASEBALL CATCHERS" filed on Oct. 26, 2015 and assigned application Ser. No. 62/246,150, the entire contents of which are hereby incorporated by reference.

BACKGROUND

The present invention relates to a system for training a baseball catcher and, more particularly, to a system for teaching the catcher the proper form for the traditional blocking position.

When a baseball is thrown in the dirt, a catcher is expected to field the ball cleanly or at least prevent the baseball from getting past it. Because of the geometry and physics of Baseball, the catcher is best served to play the ball in the dirt "safely" by:
 (1) getting its body in front of the trajectory of the bouncing ball;
 (2) falling out of its standard catching position, by dropping its knees to narrow the gap between its legs; and
 (3) dropping its glove to the ground to block any remaining gap between its legs.

This traditional blocking position affords the catcher the greatest likelihood of keeping the ball in front of it, and within a manageable distance, to prevent any struck-out batters and/or any on-base runners from advancing safely. Moreover, as is understood by a person having ordinary skill in the art, a ball in front of a catcher and within a manageable distance usually has the same affect as a skillfully but hazardously fielded ball.

Teaching a catcher, especially one of young age and inexperience, the proper form for the traditional blocking position can be quite difficult. The catcher's natural defensive instinct is usually to raise its glove off the ground even if its body is correctly falling out of its standard catching position. Unfortunately, this action is far from defensive. An inexperienced catcher simply lacks the repetitions and muscle memory to realize that using the padded/shielded portions of its body to stop the ball is the best and safest play. Instead, an inexperienced catcher's natural defensive instinct also raises and/or turns its head away from the trajectory of the bouncing ball, which exposes its entire unpadded neck to the powerful projectile.

Therefore, what is needed in the art is a system for efficiently, effectively, and safely teaching/training, the proper form for the traditional blocking position.

SUMMARY OF THE INVENTION

The present disclosure is related to a system for teaching a catcher the proper form for the traditional blocking position. A non-limiting and exemplary embodiment of the system takes the form of a detachable/strap-on/snap-on tether system for the catcher.

The exemplary system comprises one exemplary embodiment of a wrist strap, a wrist-to-facemask adjustable tether, a retractable tether, an automatic tether retraction system, a release trigger system, and a leg attachment component. The retractable tether comprises a first end and a second end. The release trigger system is configured to have a locked state and an unlocked state.

More specifically, the wrist-to-facemask adjustable tether is detachably engaged to the wrist strap. The retractable tether is detachably engaged, at the first end, to the wrist strap. The automatic tether retraction system is mechanically engaged to the second end of the retractable tether, and is configured to automatically retract and spool the retractable tether. Moreover, the release trigger system is mechanically engaged to a portion of the retractable tether, and is configured to, at least in part, lock and prevent any extension of the spooled retractable tether when in the locked state. Moreover, the leg attachment component supports, at least in part, the automatic tether retraction system and the release trigger system.

In this way, the retractable tether in conjunction with the release trigger system is configured to restrict the distance the wrist strap may range from the leg attachment component when the release trigger system is in the locked state. Moreover, the wrist-to-facemask adjustable tether is configured to restrict the distance the facemask of the catcher may range from the wrist strap In another exemplary embodiment, the retractable tether comprises a first length and a second length with the first length defined by a series of spaced stops along the surface. The spaced stops are configured to, at least in part, lock with the release trigger system, when the release trigger system is in the locked state, to prevent any extension of the spooled retractable tether. The release trigger system may mechanically engage with the first length in a ratcheting action.

In another exemplary embodiment, the automatic tether retraction system is pivotably and rotatably engaged to the leg attachment component via a surface feature defined on a housing for the automatic tether retraction system. The surface feature may be configured to receive a portion of leg attachment component.

In another exemplary embodiment, the automatic tether retraction system comprises an exemplary embodiment of a housing with internal mechanisms. The internal mechanisms may be engaged, at least in part, to a second end of the retractable tether and configured to automatically retract and spool the retractable tether into the housing. The housing may support the release trigger system at least in part. The leg attachment component may support the housing at least in part.

In another exemplary embodiment, the housing of the automatic tether retraction system comprises two clam-shell halves defining an interior and a tether opening. The interior of the housing may contain, at least in part, the internal mechanism and the spooled retractable tether. The retractable tether may extend through the tether opening from within the interior of the housing. The interior of the housing may also contain, at least in part, the release trigger system.

BRIEF DESCRIPTION OF THE DRAWINGS

In the drawings, like reference numerals refer to like parts throughout the various views unless otherwise indicated. For reference numerals with letter character designations such as "102*a*" or "102*b*", the letter character designations may differentiate two like parts or elements present in the same figure or different figures. Letter character designations for reference numerals may be omitted when it is intended that a reference numeral encompass all parts having the same reference numeral in all figures.

Specific embodiments of the present invention will be described with reference to the following drawings, wherein.

DETAILED DESCRIPTION OF THE PREFERRED EMBODIMENTS

Embodiments and aspects of the present disclosure provide a system for training a baseball catcher of the present invention. Embodiments of the system described herein may be configured to teach the catcher the proper form for the traditional blocking position by attaching to the catcher's body, and by facilitating the proper body movements to realize the final position. Embodiments of the system may facilitate the catcher's body movements by:

(1) allowing the catcher to have the usual, unimpeded range of motion, in the standard catching position, for fielding balls thrown anywhere within the strike zone down to the dirt;

(2) after the catcher has dropped to its knees out of the standard catching position, restricting the distance a catcher's glove may range from any gap formed between the catcher's legs; and (3) after the catcher has dropped its knees out of the standard catching position, restricting the distance a catcher's facemask may raise/turnway from directly facing the trajectory of any bouncing ball.

The system for training a baseball catcher may be configured for various other structures and functions apparent to a person having ordinary skill in the art in light of the present disclosure.

Figure 1:
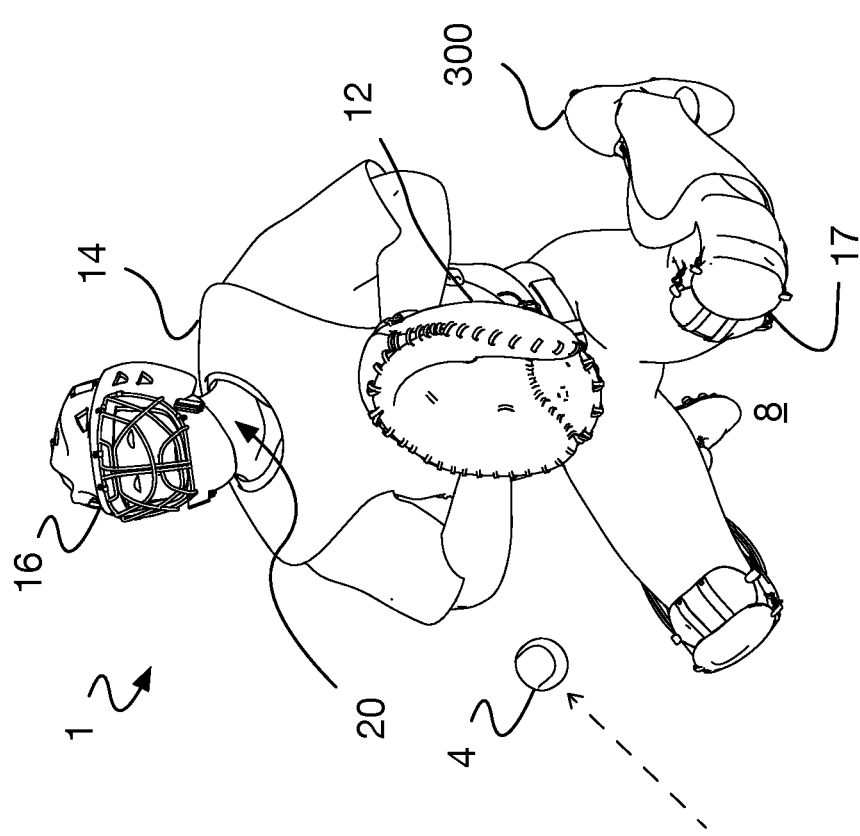
FIG. 1 is a perspective view of an exemplary embodiment of a catcher attempting the traditional blocking position and exhibiting improper form.

Referring now to the drawings, wherein the showings are for purposes of illustrating the various embodiments of the present disclosure only, and not for purposes of limiting the same, FIG. 1 is a perspective view of an exemplary embodiment of a catcher attempting the traditional blocking position and exhibiting improper form. A catcher 1 is wearing an exemplary embodiment of traditional catcher equipment (exemplary embodiment of a catcher's glove 12, a chest guard 14, a facemask 16, a knee guard and leg guard combination 17, and cleats 300) to pad and/or shield the relevant portions of the catcher 1's body, as is understood by one having ordinary skill in the art. The catcher 1 has gotten its body in front of an exemplary trajectory of an exemplary embodiment of a ball 4 previously thrown in the dirt and bouncing up towards the catcher 1. The catcher 1 has also fallen out of an exemplary standard catching position (not depicted in FIG. 1; best seen in FIGS. 12 and 16) by dropping its knees to narrow an exemplary embodiment of a gap 8 between its legs/knees. Nonetheless, the natural defensive instinct of the catcher 1 has resulted in an exemplary embodiment of misguided, improper body movements in the attempt to realize the exemplary traditional blocking position.

First, the catcher 1 has not dropped its glove 12 to the ground to block the gap 8 between its legs/knees, but instead has raised its glove 12 towards its chest guard 14/facemask 16 in an attempt to make a skillful yet hazardous catch. Second, the catcher 1 has not kept its eyes/face and, therefore, facemask 16 facing down directly towards the trajectory of the bouncing ball 4, but instead has dangerously raised and turned its eyes/face and, therefore, facemask 16 away from the trajectory of the bouncing ball 4. Consequently, the catcher 1 has not placed itself in the proper form to most likely field the ball cleanly or at least prevent the baseball from getting past it. Moreover, the catcher 1 has dangerously exposed an exemplary embodiment of a breach 20 in its head/neck shielding.

Figure 2:
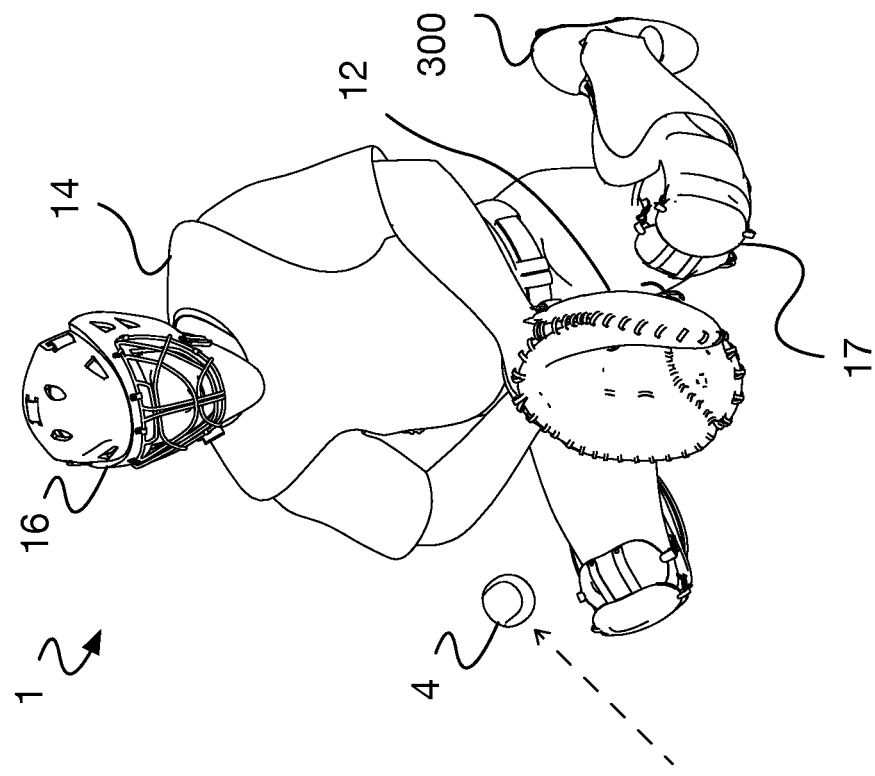
FIG. 2 is a perspective view of an exemplary embodiment of the catcher of FIG. 1 attempting the traditional blocking position and exhibiting proper form.

FIG. 2 is a perspective view of an exemplary embodiment of the catcher of FIG. 1 attempting the traditional blocking position and exhibiting proper form. The catcher 1 has gotten its body in front of the exemplary trajectory of the bouncing ball 4 previously thrown in the dirt and bouncing up towards the catcher 1. The catcher 1 has also fallen out of the standard catching position (also not depicted in FIG. 2; best seen in FIGS. 31 and 32) by dropping its knees to narrow the gap 8 (not seen in FIG. 2 as obscured by the glove 12; best seen in FIG. 1) between its legs. Moreover, the catcher 1 has dropped its glove 12 to the ground, and kept it there (regardless of any bad bounce that might occur in the exemplary trajectory) to block the gap 8 between its legs. Moreover, the catcher 1 has kept its eyes/face and, therefore, facemask 16 facing down directly towards the trajectory of the bouncing ball 4. Consequently, the catcher 1 has placed itself in the proper form to most likely field the ball cleanly or at least prevent the baseball from getting past it. Moreover, the catcher has maximized the effectiveness of the padded/shielded portions of its body for a risky and unpredictable play involving a powerful projectile.

Figure 3:
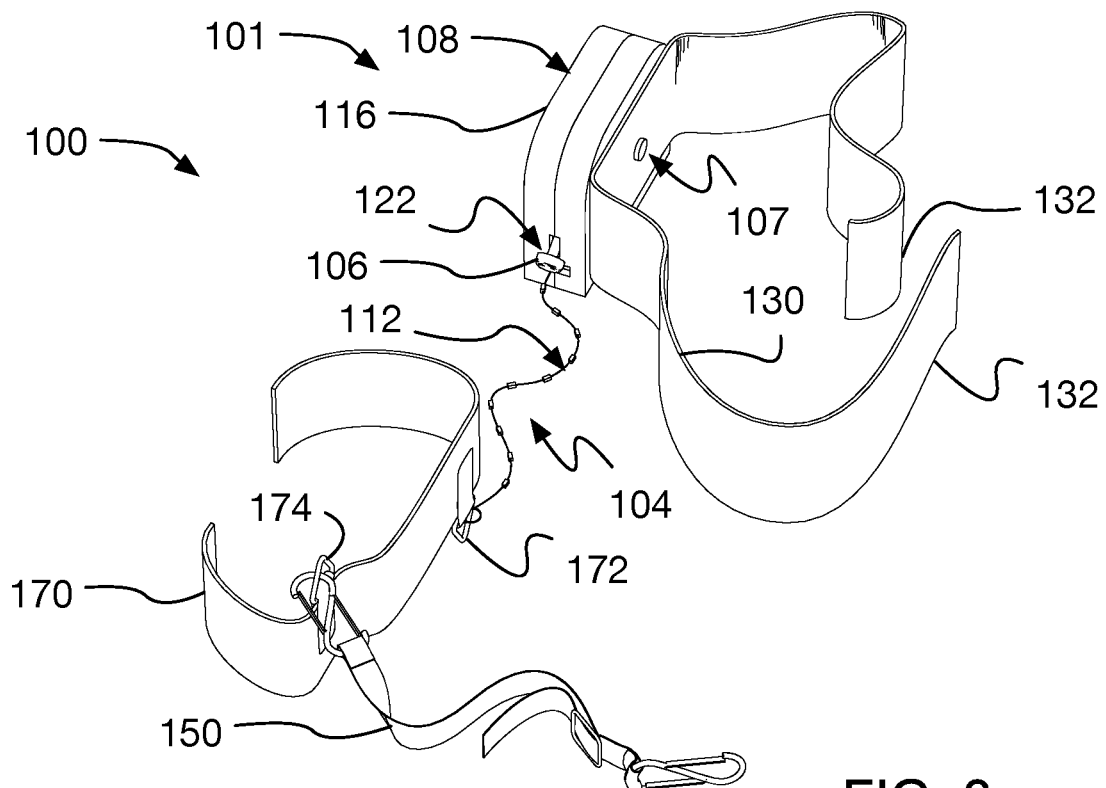
FIG. 3 is a perspective view of a first exemplary embodiment of a system for training a baseball catcher.

FIG. 3 is a perspective view of a first exemplary embodiment of a system for training a baseball catcher of the present invention. A system 100 comprises a first exemplary embodiment of a wrist-to-leg adjustable tether system 101, a first exemplary embodiment of a leg attachment component 130, a first exemplary embodiment of a wrist-to-facemask adjustable tether 150, and a first exemplary embodiment of a wrist strap 170.

The cylindrical tether 104 of the wrist-to-leg adjustable tether system 101 (described in greater detail herein) is detachably engaged to the wrist strap 170. The tether 104 is configured to mechanically link and restrict the distance the wrist strap 170 may range from the leg attachment component 130 during certain body motions of the user (described in greater detail herein). Moreover, the wrist-to-facemask adjustable tether 150 is detachably engaged to the wrist strap 170. Therefore, the wrist-to-facemask adjustable tether 150 is also configured to mechanically link and restrict the distance any attached facemask may range from the wrist strap 170 during certain body motions of the user; however, this is also interconnected to the mechanical link between the wrist strap 170 and the leg attachment component 130 during those same body motions (described in greater detail herein).

In this way, when the leg attachment component 130 is, for example, detachably engaged to a user's leg, and when the wrist-to-facemask adjustable tether 150 is attached to the user's facemask, and when the wrist strap 170 is detachably engaged to a user's right wrist, the system 100 facilitates training the proper form for the traditional blocking position (described in greater detail herein). More specifically, the system 100 proactively and selectively restricts certain improper body motions of a user when that user is dropping to its knees, bringing its glove/wrist down, out of the standard catching position, and attempting to establish a traditional blocking position. Although the system 100 does proactively restrict certain improper body motions and certain collaterally related body motions, the system 100 allows the user to field balls in the standard catching position, thrown anywhere within the strike zone or in the dirt below the strike zone, with its usual, unimpeded range of motion.

Furthermore, the system for training a baseball catcher 100 is configured to attach comfortably to a user such as the catcher 1 of FIGS. 1 and 2 or any other sized/experienced player. The overall size, shape, and weight of the system 100 is such that attachment of the system 100 to a user's body does not significantly impede the usual capabilities/body motions of the user, other than those intended to be restricted or those collaterally related (described in greater detail herein). Moreover, during attachment, the system 100 is configured for ergonomic, medically-safe attachment of any components, or portions of components, that engage proximate or on to the user's body. Moreover, during attachment, the system 100 is configured to engage proximate or on to the user's body without interfering with the placement, engagement, and/or function of any equipment (standard or supplemental) that may also be used by the user.

More specifically, the components or portions of components of the system for training a baseball catcher 100 is made of any material (natural, synthetic, or blend). In one exemplary embodiment, the straps of the system 100 are made of nylon, and the hard components/links/mechanics are made of aluminum or steel or hardened plastics or polymers. Moreover, the components or portions of components of the system 100 are configured to have relatively smooth and/or rounded interfaces where the system engages up against the user. This is especially true for components or portions of component of the system that can engage to the exposed/semi-exposed body of the catcher 1 (e.g., the wrist, the thigh/leg, the foot/leg etc.; may help avoid irritation and excess pressure/blood flow constriction). Moreover, the components or portions of components of the system 100 are configured for relatively easy adjustment (via the use of adjustable fastening means such as hook and loop fasteners, replaceable carabiners, elastic/malleable/stretchable loops, etc.) to accommodate differently built and shaped users of any size/experience. Moreover, the components or portions of components of the system 100 are configured for comfortable engagement to the user at portions of the body not usually occupied by other relevant equipment (such as at the wrist behind the glove 12 and at the thigh above/below the knee guard and leg guard combination 17, for example) without need for any special equipment or preparation. Moreover, the components or portions of components of the system 100 is also configured for comfortable engagement to the user at portions of the body already occupied by other relevant equipment (such as at a portion of the frame of the facemask 16 and at the foot on top of the cleat 300, for example) without need for any special equipment or modification (in placement or structure) to the relevant equipment.

Returning to FIG. 3 with more specificity, the wrist-to-leg adjustable tether system 101 comprises one exemplary embodiment of a wound cord/cylindrical tether 104, a release trigger system 106, and a tether retraction system 108. In this particular embodiment, the tether retraction system 108 comprises an exemplary embodiment of a clam-shell housing 116, defining a tether opening 122 for extending the internally wound tether 104 there through (described in greater detail herein; best seen in FIG. 5A). The tether retraction system 108 also comprises an exemplary embodiment of an automatic internal retraction mechanism 117 (described in greater detail herein; best seen in FIG. 5A) enclosed/supported by the clam-shell housing 116 and mechanically engaged with the internally wound tether 104 and the release trigger system 106. The tether retraction system 108 also is pivotably, rotatably engaged to the leg attachment component 130 (described in greater detail herein; best seen in FIG. 5B).

As such, the tether retraction system 108 is configured as an exemplary embodiment of an automatic tether retraction system 108. A person having ordinary skill in the art, however, understands that this specific exemplary automatic tether retraction system, with its specific shape, structure, dimensions, configuration, and internal mechanisms does not limit the scope of the invention. Instead, it is envisioned that the tether retraction system 108 may be circular/curved or any other shape other than cuboid. Moreover, it is envisioned that the tether retraction system 108 may have a housing that is more complex than a simple clamshell housing comprising two halves. Moreover, it is envisioned that the tether retraction system 108 may have any suitable means for engaging to the leg attachment component 130, or any other component or sub-component of the system 100, which facilitates appropriate mechanical pivoting of the tether retraction system 108 (as is understood by a person having ordinary skill in the art) when the system 100 is fully engaged to the user and the wound tether is being extended/retracted. Moreover, it is envisioned that the tether retraction system 108 may have any necessary power source, internal mechanisms, system bus, circuitry, etc. to facilitate automation.

It is also envisioned that the tether retraction system 108 may not be automated and, therefore, may have any mechanical structures (fixed or variable or dynamic) that translate or absorb/transfer mechanical forces acting through the system 100. Finally, it is also envisioned that the tether retraction system 108 may not be automated by mechanical components or sub-components, but instead function more like the second exemplary embodiment of the system 200 described relative to FIGS. 15-17 (described in greater detail herein).

Figure 5A:
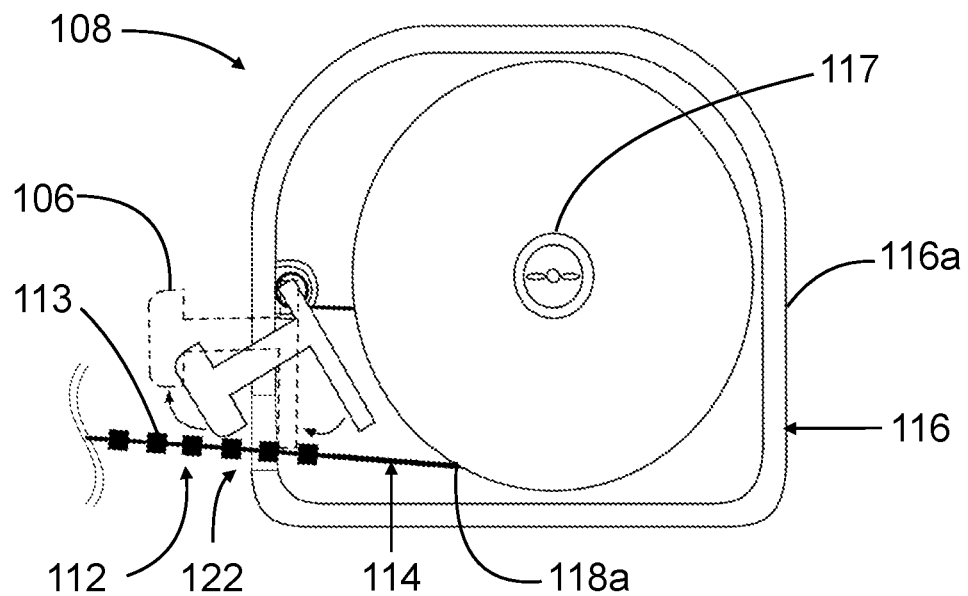
FIG. 5A is an inside view of an exemplary embodiment of a first clam-shell housing half for the automatic tether retraction system of FIGS. 3 and 4 illustrating mechanical operation of an exemplary embodiment of an automatic internal retraction mechanism, the wound tether, and the release trigger system.
Figure 5B:
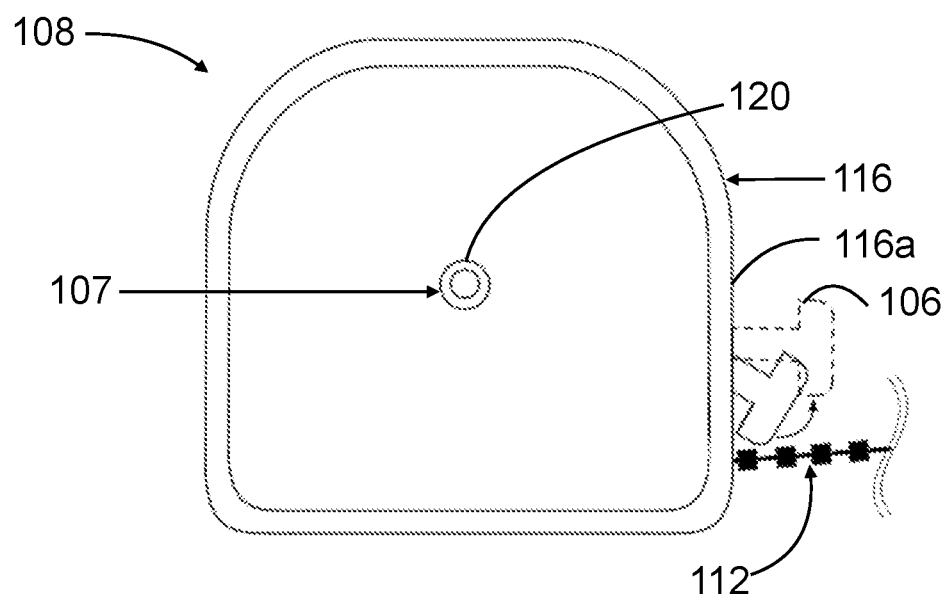
FIG. 5B is an outside view of the first clam-shell housing half of FIG. 5A.

Returning to FIG. 3, the exemplary automatic tether retraction system 108 is detachably engaged to the leg attachment component 130 via a means for rotatably mounting 107 (not seen in FIG. 3; partially seen in FIG. 5B). The means for rotatably mounting 107 is partially situated/facilitated by a surface feature/subcomponent of the clamshell housing 116 (not seen in FIG. 3; best seen in FIG. 5B). Moreover, the leg attachment component 130 is configured as an exemplary embodiment of a thigh strap comprising a hook and loop fastening means 132. Additionally, the wrist strap 170 comprises an exemplary embodiment of a tether engagement component 172 and a facemask engagement component 174, both configured as an exemplary embodiment of a retained ring.

As such, when the leg attachment component 130 is, for example, detachably engaged to a user's leg, and when the wrist-to-facemask adjustable tether 150 is attached to the user's facemask, and when the wrist strap 170 is detachably engaged to a user's right wrist, and when the cylindrical tether 104 of the wrist-to-leg adjustable tether system 101 is detachably engaged to the wrist strap 170 (via the tether retained ring 172), and when the wrist-to-facemask adjustable tether 150 is detachably engaged to the wrist strap 170 (via the facemask retained ring 174), the internally wound tether 104 is configured to mechanically link and restrict the distance the wrist strap 170 may range from the leg attachment component 130 during certain body motions of the user. Moreover, the wrist-to-facemask adjustable tether 150 is also configured to mechanically link and restrict the distance any attached facemask may range from the wrist strap 170. Moreover, the automatic tether retraction system 108 is configured to automatically retract any portion of the wound cord/cylindrical tether 104 that was previously extended (described in greater detail herein). Moreover, the wound cord/cylindrical tether 104, in conjunction with the release trigger system 106 and/or the automatic tether retraction system 108, for example, is configured to lock and prevent any further extension of the wound cord/cylindrical tether 104 (described in greater detail herein).

In this way, the system 100 is configured to train the proper form for the traditional blocking position. More specifically, when a user establishes the standard catching position, the tether retraction system 108 and/or the release trigger system 106 lock and fix any maximum extendable length of the wound cord/cylindrical tether 104 such that if the user drops to its knees, out of the standard catching position, the user's right wrist is pulled down towards the ground and prevented from being moved up beyond any available slack (described in greater detail herein). Moreover, because of the mechanical link between the wrist-to-facemask adjustable tether 150 and the wrist strap 170, when a user drops its knees out of the standard catching position, the user's facemask is pulled down towards the ground and prevented from being moved up.

A person having ordinary skill in the art understands that the above is true even if the wrist-to-leg adjustable tether system 101, the leg attachment component 130, the wrist-to-facemask adjustable tether 150, and the wrist strap 170 are not shaped, structured, configured, and/or composed as specifically shown in the FIGS. thus far. In particular, it is envisioned that the leg attachment component 130 may not be structured as a strap but instead attach to a user's leg/feet/lower extremities via other structures/equipment already present or to-be present on the user. Moreover, it is envisioned that the wrist-to-facemask adjustable tether 150 may not be structured as a strap but instead attach to a user's facemask/head via other structures/equipment already present or to-be present on the user. Moreover, it is envisioned that the wrist strap 170 may not be structured as a strap but instead attach to a user's glove/wrist/arm via other structures/equipment already present or to-be present on the user.

Figure 4:
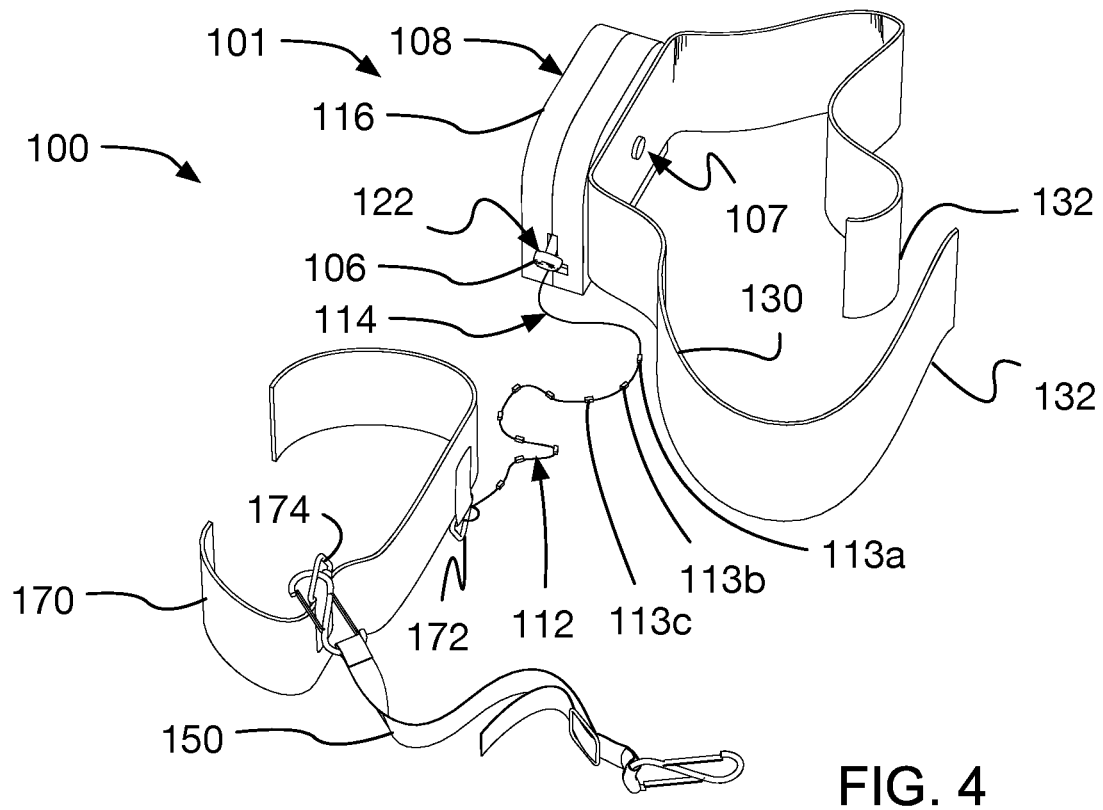
FIG. 4 is a perspective view of the system for training a baseball catcher of FIG. 3 with an exemplary embodiments of a wound cord/cylindrical tether partially extended out of an exemplary embodiment of an automatic tether retraction system, as an exemplary embodiment of a release trigger system is actuated.

FIG. 4 is a perspective view of the system for training a baseball catcher of FIG. 3 with the wound tether partially extended out of the automatic tether retraction system, as the release trigger system is actuated. More specifically, the wound tether 104 is partially extended out of the automatic tether retraction system 108 thereby increasing the distance the wrist strap 170 may range from the thigh strap 130.

The wound tether 104 comprises exemplary embodiments of a first length 112, defined by an exemplary embodiment of a series of spaced stops 113, and a second length 114 defined without stops. The first stop 113a, and stops 113b, 113c, etc. are built-up/protruding portions along the first length 112 in this particular embodiment. The wound cord/cylindrical tether 104a along its second length 114 is partially extended out of the automatic tether retraction system 108 such that the first stop 113a of the first length 112, and all other stops, are exposed and free from the automatic tether retraction system 108 and/or the release trigger system 106 (described in greater detail herein; best seen in FIG. 5A). The second length 114 defined without stops is partially exposed.

As such, when the first length 112 defined by the series of spaced stops 113 is fully or partially retracted within the automatic tether retraction system 108 and/or mechanically engaged with the release trigger system 106, the first length 112 is configured to facilitate any locking/"prevention of further extension" that might exist between the wound tether 104, the release trigger system 106, and/or the automatic tether retraction system 108 (described in greater detail herein; best seen in FIG. 5A). Moreover, the second length 114 defined without stops is configured to facilitate any adjustable extension or any automatic retraction of the wound tether 104 out of the automatic tether retraction system 108. Moreover, the release trigger system 106 is configured to facilitate a user's disengagement/unlocking of the wound cord/cylindrical tether 104 involving the first length 112 defined by the series of spaced stops 113 (described in greater detail herein; best seen in FIG. 5A).

Figure 11:
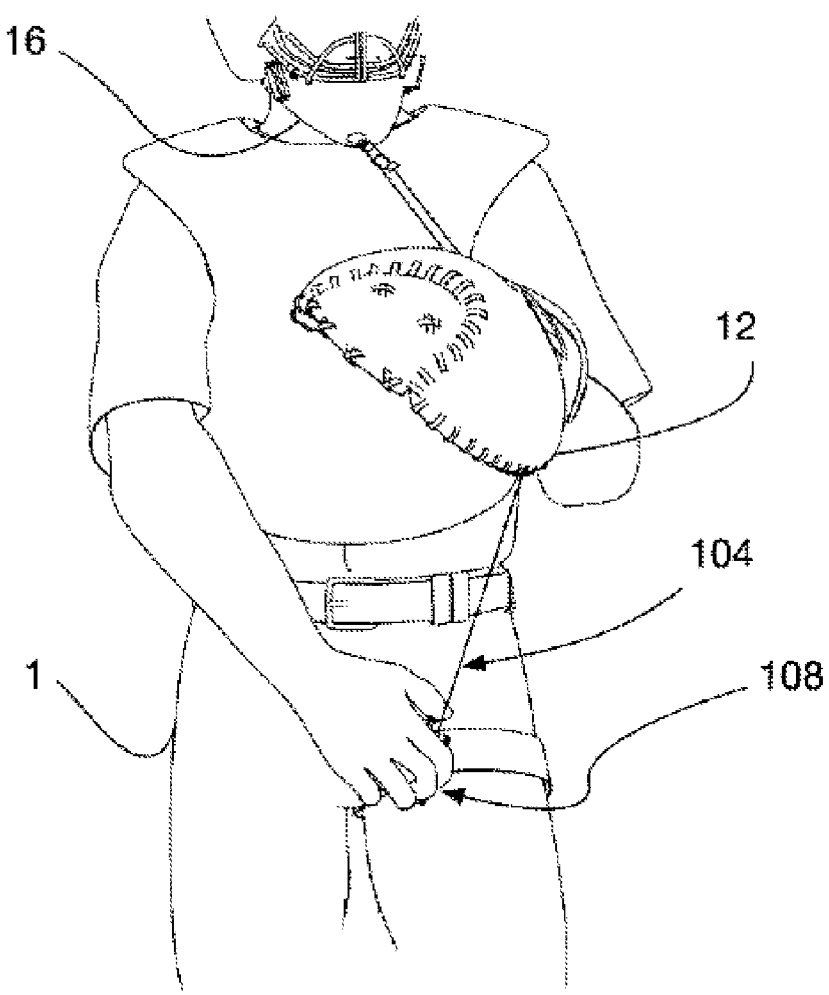
FIG. 11 is a perspective view of the catcher of FIGS. 8-11 in a standing position and extending the wound tether out of the automatic tether retraction system by actuating the release trigger system.

Said another way: once the wound cord/cylindrical tether 104 is extended out of the automatic tether retraction system 108, beyond the first length 112 defined by the series of spaced stops 113, the release trigger system 106 plays no significant role in any extension or automatic retraction of the wound cord/cylindrical tether 104 along the second length 114 defined without stops (described in greater detail herein; best seen in FIG. 11).

In this way, when a partially extended wound tether 104 (out of an automatic tether retraction system 108, for example) is locked via the first length 112 defined by the series of spaced stops 113, the maximum distance the wrist strap 170 may range from the thigh strap 130 is set. A person having ordinary skill in the art understands that the specific individual stop 113 (for example, stop 113b, 113c, etc.) that catches/locks with the release trigger system 106, and/or the automatic tether retraction system 108a, depends at least in part on the amount of momentum carried by the wound tether 104a as it automatically retracts into the automatic tether retraction system 108.

Furthermore, a person having ordinary skill in the art understands that the above is true even if the wound tether 104, the first length 112, the series of spaced stops 113, and the second length 114 are not shaped, structured, configured, and/or composed as specifically shown in the FIGS. thus far. In particular, it is envisioned that the wound tether 104 may not be structured as a cylindrical cord but instead may be any type of cable, wire, strand, or bundle with any type of reinforcement, profile, or surface feature. Moreover, it is envisioned that the spaced stops 113 may not be structured as built-ups/protrusions in node frequencies but instead may have any type of pattern, grouping, composition, or geometry that facilitate a ratcheting, catching, locking, etc. type of action in the wound tether 104 as it is being retracted and/or extended.

Figure 6A:
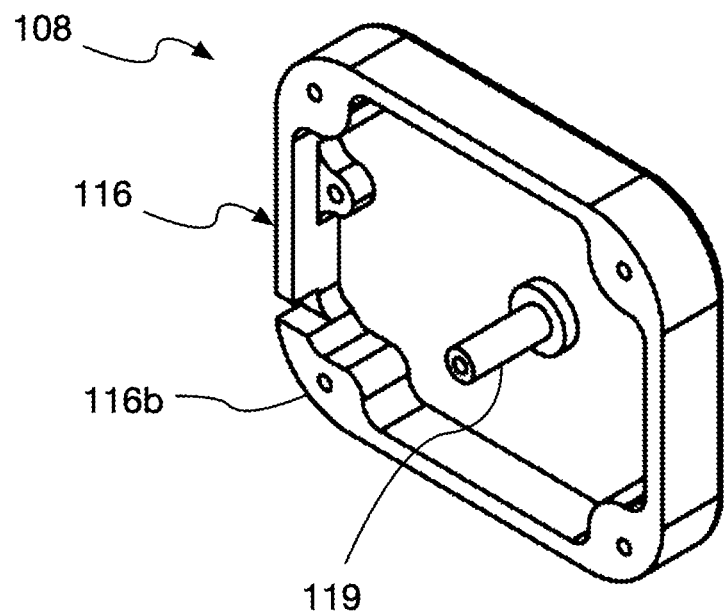
FIG. 6A is a perspective inside view of an exemplary embodiment of a second, complementary clam-shell housing half for the first clam-shell housing half of FIG. 5.
Figure 6B:
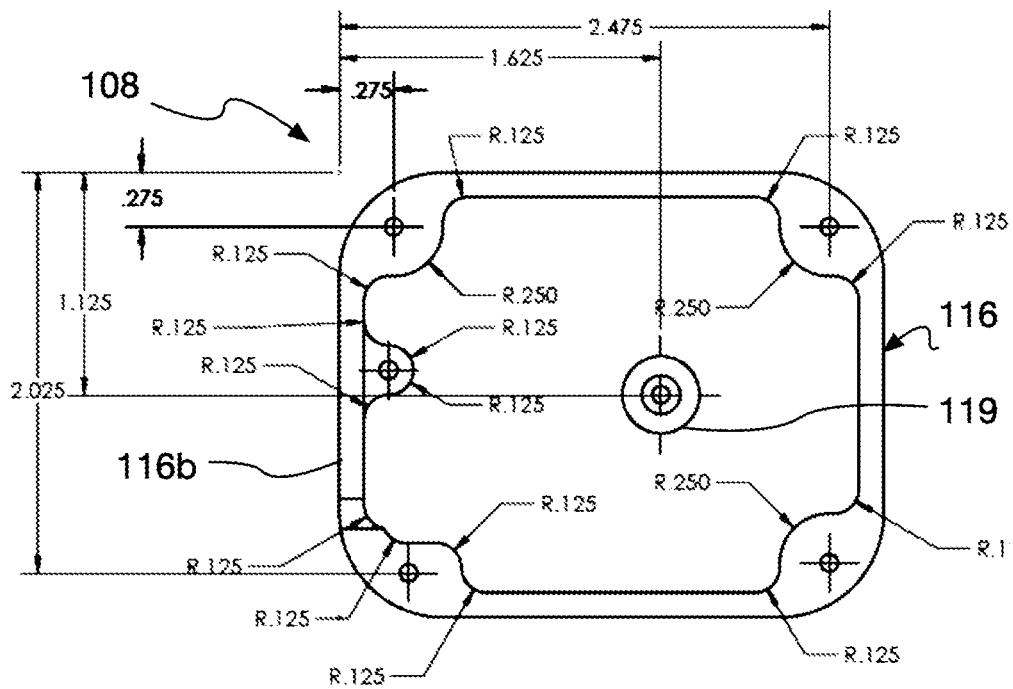
FIG. 6B is an inside, schematic view of the second complementary clam-shell housing half of FIG. 6A.
Figure 7A:
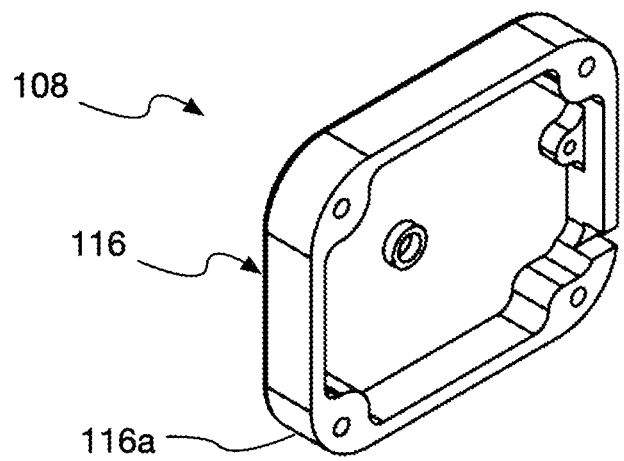
FIG. 7A is a perspective inside view of the first clam-shell housing half of FIG. 5.
Figure 7B:
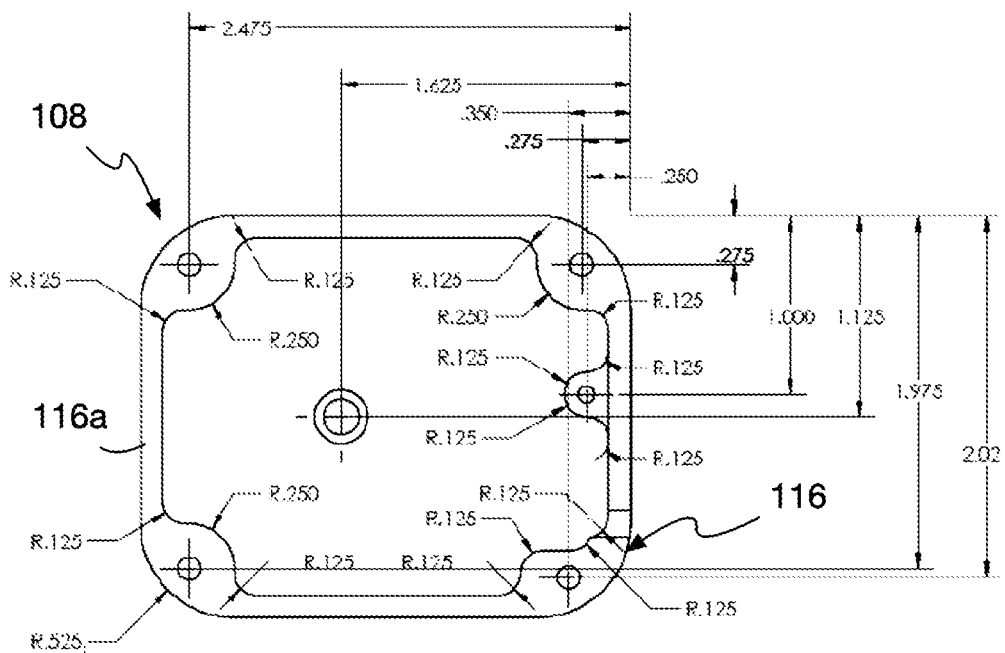
FIG. 7B is an inside, schematic view of the first clam-shell housing half of FIGS. 5 and 7A.

FIGS. 5-7 illustrate the details and internal mechanics of an exemplary embodiment of an automatic tether retraction system. More specifically, FIG. 5A is an inside view of an exemplary embodiment of a first clam-shell housing half for the automatic tether retraction system of FIGS. 3 and 4 illustrating internal mechanical operations, the wound tether, and the release trigger system. FIG. 5B is an outside view of the first clam-shell housing half of FIG. 5A. FIG. 6A is a perspective inside view of an exemplary embodiment of a second, complementary clam-shell housing half for the first clam-shell housing half of FIG. 5. FIG. 6B is an inside, schematic view of the second complementary clam-shell housing half of FIG. 6A. FIG. 7A is a perspective inside view of the first clam-shell housing half of FIG. 5. FIG. 7B is an inside, schematic view of the first clam-shell housing half of FIGS. 5 and 7A.

As previously described, in this particular embodiment, the exemplary wrist-to-leg adjustable tether system 101 comprises the wound tether 104, the release trigger system 106, and the automatic tether retraction system 108. The automatic tether retraction system 108 comprises the clam-shell housing 116 and the automatic internal retraction mechanism 117 enclosed/supported/anchored therein/ thereon. The automatic internal retraction mechanism 117, of the automatic tether retraction system 108, and the release trigger system 106 are mechanically engaged with the wound tether 104.

More specifically, the clam-shell housing 116 is made up of a first exemplary embodiment of a first shell half 116a (best seen in FIGS. 5 and 7) and a first exemplary embodiment of a second shell half 116b (best seen in FIG. 6). The release trigger system 106 is configured as a release mechanism comprising a spring loaded gate anchored and configured to mechanically act off of the clam shell half 116a and on the wound tether 104. Moreover, within the clam-shell housing halves 116a, b, the automatic tether retraction system 108 houses the automatic internal retraction mechanism 117 comprising an exemplary embodiment of a spool 118 (best seen in FIG. 5A) upon which the extendable/ automatically retractable wound tether 104 is anchored/ engaged. The automatic internal retraction mechanism 117, and spool 118 in particular, mechanically link with a means for mechanizing retraction of the tether. In this embodiment, the means for mechanizing retraction is, at least in part, a torsional spring supported by the first shell half 116a and acting on the wound tether 104.

As such, when the first length 112 defined by the series of spaced stops 113 is fully or partially retracted within the automatic tether retraction system 108, and when the spring loaded gate 106 is mechanically engaged and closed in between the spaced stops 113 of the wound, retracted tether 104 (best seen in FIG. 5A), the first length 112 facilitates locking/"prevention of further extension" for the wound tether 104 out of the automatic tether retraction system 108.

Furthermore, should the release trigger system 106 be actuated such that the spring loaded gate is loaded, the first length 112 of the wound tether 104 is released from the locked state and is configured to be extended, spooled out of the automatic tether retraction system 108. A person having ordinary skill in the art understands that extension of the wound tether 104 loads the torsional spring of the automatic internal retraction mechanism 117, which is supported by the first shell half 116a, such that the wound tether 104 may be automatically retracted, spooled back onto the spool 118 when released. Should the release trigger system 106 be de-actuated, the spring loaded gate is release and the locked state is re-engaged when the first length 112 defined by the spaced stops 113 is retracted sufficiently into the automatic tether retraction system 108.

As previously described, the torsional spring supported by the first shell half 116a and acting on the wound tether 104 functions as the means for mechanizing retraction within the automatic tether retraction system 108. The first shell half 116a on the outside, opposite the side with the automatic internal retraction mechanism 117, defines a smooth external surface with a recessed surface feature 120. The recessed surface feature 120, in this particular embodiment, is configured as a means for rotatably mounting the automatic retraction system 108 with the leg attachment component 130

As such, when the leg attachment component 130 is, for example, detachably engaged to a user's leg and the would tether 104 is detachably engaged to a user's wrist strap, and when the automatic retraction system 108 is mounted onto the leg attachment component 130 via, at least in part, the recessed surface feature 120, the automatic retraction system 108 is configured to pivot about the recessed surface feature 120 such that the tether 104 has a straight path, unobstructed to the user's wrist. The automatic retraction system 108 is also configured to adjust its position and angle as it pivots, to obtain equilibrium.

Briefly returning to the clam-shell housing 116, the second clam-shell housing half 116b (best seen in FIGS. 6A and 6B) is complementary to the first clam-shell housing half 116a (best seen in FIGS. 7A and 7B) so as to form the housing for the automatic retraction system 108 and it's internal mechanisms. The clam-shell housing halves 116a, b come together/into alignment such that the halves may be fastened to form the curved cuboid of the present embodiment, and to define the tether opening 122 through which the wound tether 104 traverses the housing 116. The clam-shell housing half 116b supports/sandwiches the release trigger system 106 so as to enable/anchor its mechanical function.

Moreover, the clam-shell housing half 116b defines an internal surface feature 119 (best seen in FIG. 6A) configured to help support and enable the automatic internal retraction mechanism 117 and the spool 118 in particular.

A person having ordinary skill in the art understands that the above is true even if the clam-shell housing halves 116a, b, the release trigger system 106, and the automatic internal retraction mechanism 117 are not shaped, structured, configured, and/or composed as specifically shown in the FIGS. thus far. In particular, it is envisioned that the clam-shell housing halves 116a, b may take any shape, structure, or design and may even involve other components or sub-components to form the housing 116 and contain/enable its internal mechanics. Moreover, the release trigger system 16 may incorporated any other type of release mechanism including or not including a spring loaded gate. This is especially true if the wound tether 104 takes a different configuration than that specifically described with first length 112 and second length 114, or if the spaced stops 113 are configured to operate differently than described herein. Moreover, the automatic internal retraction mechanism 117 may incorporated any other type of means for mechanizing retraction of the tether including or not including a torsional spring-enabled spool. This is especially true if the housing 116 and/or the wound tether 104 take a different configuration than that specifically described, or if the amount of retraction forced needed exceeds the capabilities of a torsional spring-powered spool.

Figure 8:
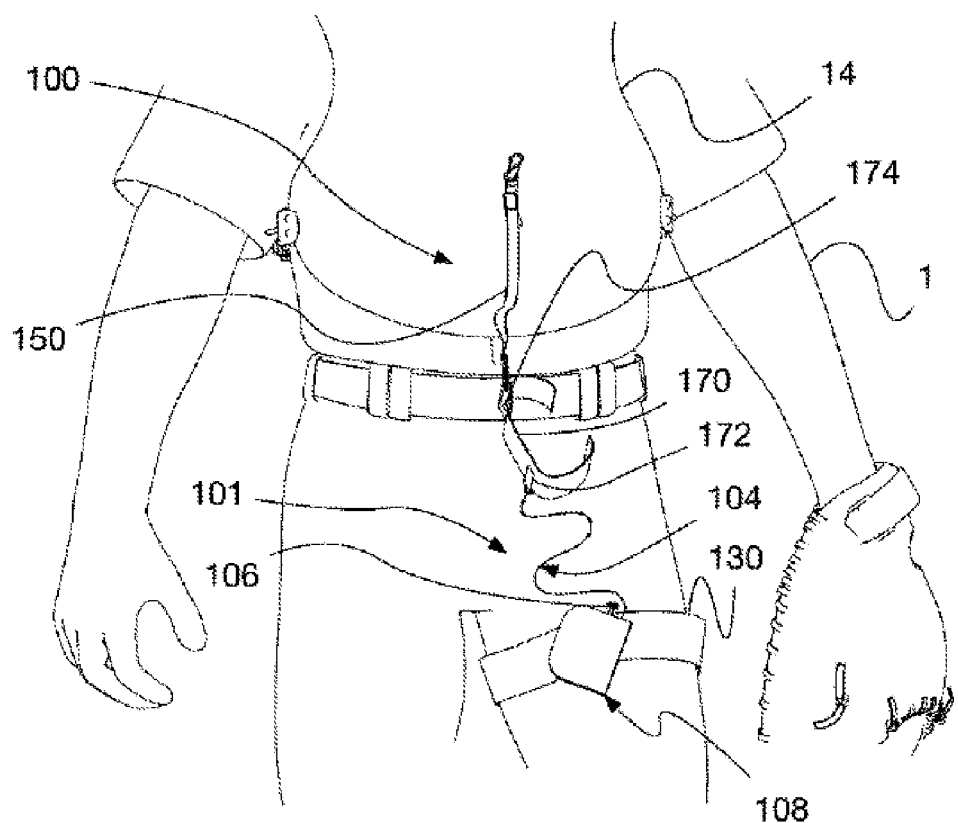
FIG. 8 is a perspective view of the catcher of FIGS. 1 and 2 with the system for training a baseball catcher of FIGS. 3 and 4 detachably engaged to the left leg of the catcher.

FIG. 8 is a perspective view of the catcher of FIGS. 1 and 2 with the system for training a baseball catcher of FIGS. 3 and 4 detachably engaged to the left leg of the catcher. The wrist-to-leg adjustable tether system 101 is detachably engaged to the catcher 1 via the thigh strap 130 such that the automatic tether retraction system 108 is proximate to the inner left thigh, and such that the release trigger system 106 is readily and easily accessible by a catcher 1. The wound cord/cylindrical tether 104 is extendible away from the catcher 1. The thigh strap 130 is positioned comfortably and without interference with the knee guard and leg guard combination 17. The wound tether 104 is attached to the wrist strap and, therefore, the rest of the system 100, via the tether retained ring 172.

Figure 9:
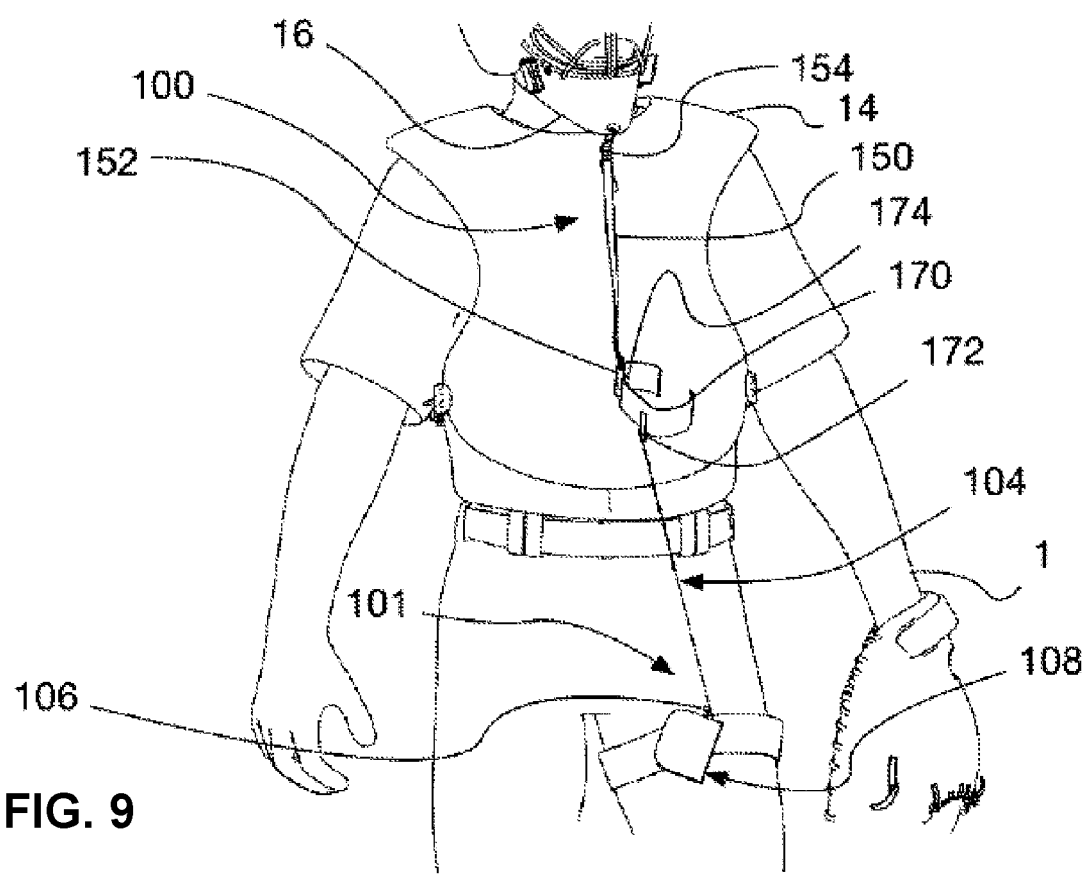
FIG. 9 is a perspective view of the catcher of FIG. 8 with the system for training a baseball catcher also detachably engaged to the facemask of the catcher.

FIG. 9 is a perspective view of the catcher of FIG. 8 with the system for training a baseball catcher also detachably engaged to the facemask of the catcher. The wrist strap 170 has an increased distance away from the thigh strap 130, and the first length 112 of the wound tether 104 is fully extended out of the automatic tether retraction system 108, and the second length 114 is partially extended out of the automatic tether retraction system 108. The wrist strap 170 is positioned at the same relative height as the catcher 1's wrist directly in front of the chest guard 14. The wrist-to-facemask adjustable tether 150 is detachably engaged to the wrist strap 170 via an exemplary embodiment of a first carabiner 152 at the facemask retained ring 174. Moreover, the wrist-to-facemask adjustable tether 150 is detachably engaged to the facemask 16 via an exemplary embodiment of a second carabiner 154 using the frame-structure of the facemask 16 itself. A person having ordinary skill in the art understands that there are various apparatus and methods for detachaby engaging to the wrist strap 170 and for detachaby engaging to the facemask 154.

Figure 10:
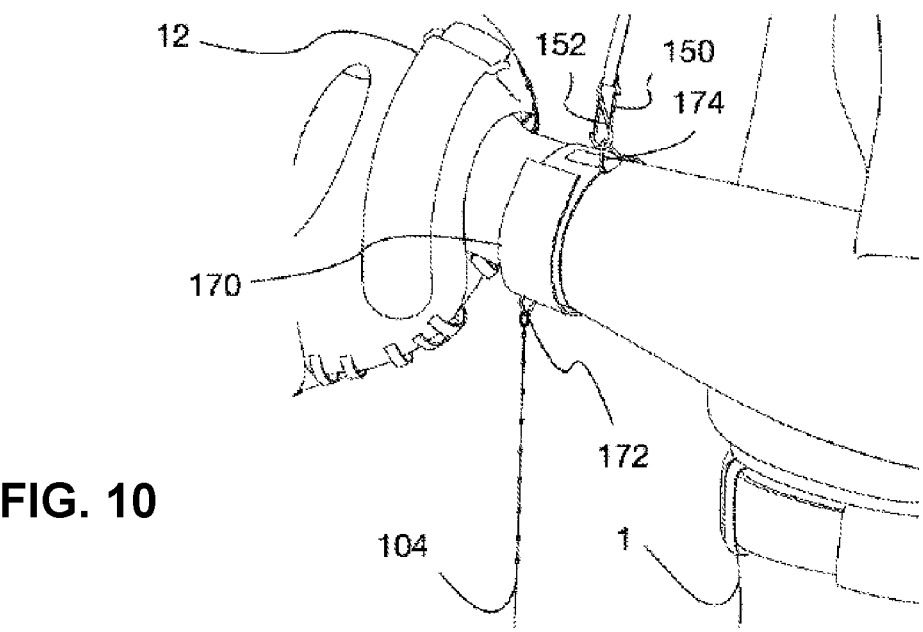
FIG. 10 is a perspective view of the catcher of FIG. 8 with the system for training a baseball catcher also detachably engaged to the left wrist of the catcher.

FIG. 10 is a perspective view of the catcher of FIG. 8 with the system for training a baseball catcher also detachably engaged to the left wrist of the catcher. The wrist strap 170 may be detachably engaged to the left wrist of the catcher 1 via a hook and loop fastener system 132 distributed along an exemplary embodiment of a first end 172 and a second end 174 of the wrist strap 170. A person having ordinary skill in the art understands that there are various apparatus and methods for detachaby engaging to the wrist strap 170 to the catcher 1.

Furthermore, the wrist-to-facemask adjustable tether 150 has its slack reduced to mechanically link the wrist-to-facemask adjustable tether 150 to the wrist strap 170 and, consequently, the catcher's wrist. As previously described, the wrist strap 170, at the normal, relative height in front of the chest guard 14, has an increased distance away from the thigh strap 130, and the first length 112 of the wound tether 104 is fully extended out of the automatic tether retraction system 108, and the second length 114 is partially extended out of the automatic tether retraction system 108. The first stop 113a of the first length 112, and all other stops, are exposed and free from the automatic tether retraction system 108 and/or the release trigger system 106. The second length 114 defined without stops is partially exposed. In this state, the release trigger system 106 plays no significant role in any extension or automatic retraction of the wound cord/cylindrical tether 104 along the second length 114 defined without stops.

FIG. 11 is a perspective view of the catcher of FIGS. 8-11 in a standing position and extending the wound tether out of the automatic tether retraction system by actuating the release trigger system. More specifically, the catcher 1 is engaging with the release trigger system 106 to confirm that the first length 112 is fully extended out of the automatic tether retraction system 108, and that the second length 114 is freely extending out of, or retracting into, the automatic tether retraction system 108. The catcher 1 now has a relatively, free range of motion for his left wrist/glove 12 (i.e., the wound tether 104 should not be catching on anything that inhibits the free range of motion).

Figure 12:
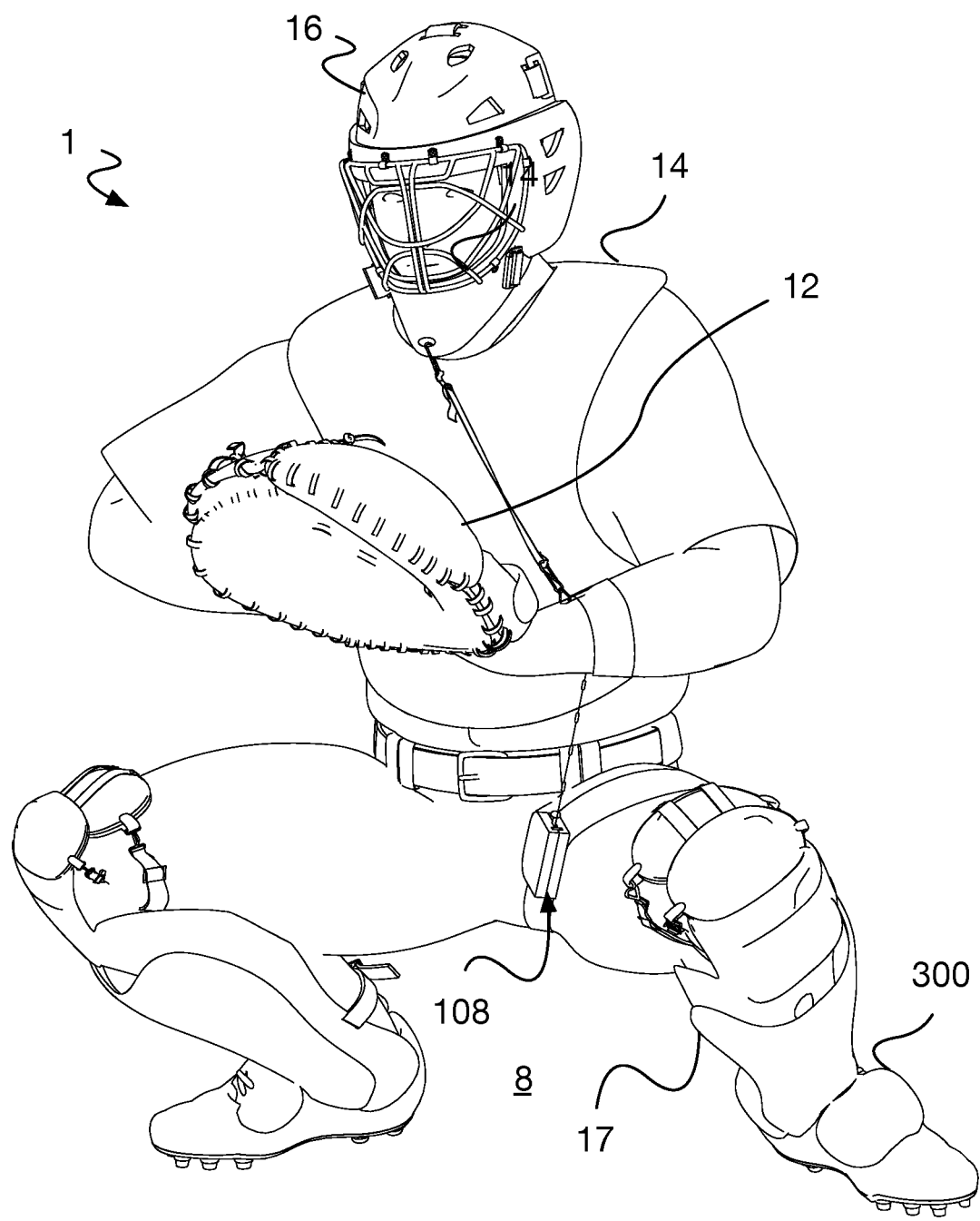
FIG. 12 is a perspective view of the catcher of FIG. 11 in a standard catching position.

FIG. 12 is a perspective view of the catcher of FIG. 11 in a standard catching position. The second length 114 of the wound cord/cylindrical tether 104 has retracted fully into the automatic tether retraction system 108, and at least the first stop 113 of the first length 112 has caught/locked with the release trigger system 106 and/or the automatic tether retraction system 108.

More specifically, the wound cord/cylindrical tether 104 along its second length 114 has automatically retracted into the automatic tether retraction system 108 until at least the first stop 113 (best seen in FIG. 5A) of the first length 112 catches/locks with the release trigger system 106 and/or the automatic tether retraction system 108. In this way, when a partially extended wound cord/cylindrical tether 104 is locked via the first length 112 defined by the series of spaced stops 113, the maximum distance the wrist strap 170 may range from the thigh strap 130 is set. A person having ordinary skill in the art understands that the specific individual stop 113 (for example, stop 113b, 113c, etc.) that catches/locks with the release trigger system 106, and/or the automatic tether retraction system 108, depends at least in part on the amount of momentum carried by the wound cord/cylindrical tether 104 as it automatically retracts into the automatic tether retraction system 108.

Figure 13:
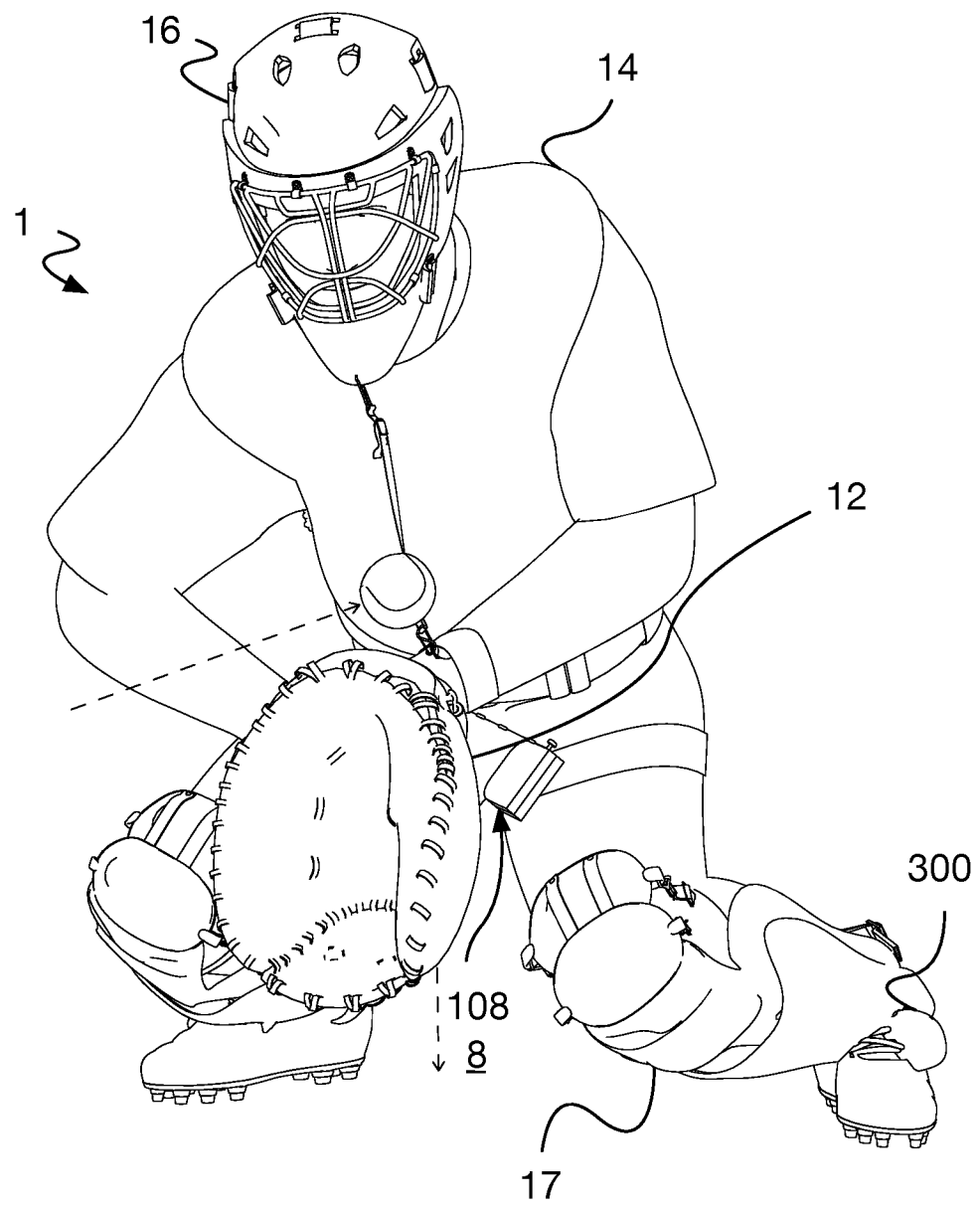
FIG. 13 is a perspective view of the catcher of FIG. 12 dropping its knees and glove/left wrist to enter a blocking position.

FIG. 13 is a perspective view of the catcher of FIG. 12 dropping its knees and glove/left wrist to enter a blocking position. Because the second length 114 of the wound cord/cylindrical tether 104 has retracted fully into the automatic tether retraction system 108, and because the stops 113 of the first length 112 have caught/locked, the automatic tether retraction system 108 will prevent any further extension of the wound cord/cylindrical tether 104 even if the catcher 1 attempts such extension proactively or as a defensive reaction. In this way, when catcher 1 establishes the standard catching position, the automatic tether retraction system 108 and/or the release trigger system 106 is locked to fix any maximum extendable length of the wound cord/cylindrical tether 104. Therefore, as the catcher 1 drops to its knees and legs, and propels its feet backwards, out of the standard catching position, the catcher 1's left wrist is pulled down towards the ground and prevented from being moved up beyond any available slack. Because of the mechanical link throughout the entire system 100, the catcher facemask 16 is pulled down towards the ground and prevented from being moved up beyond any available slack.

Figure 14:
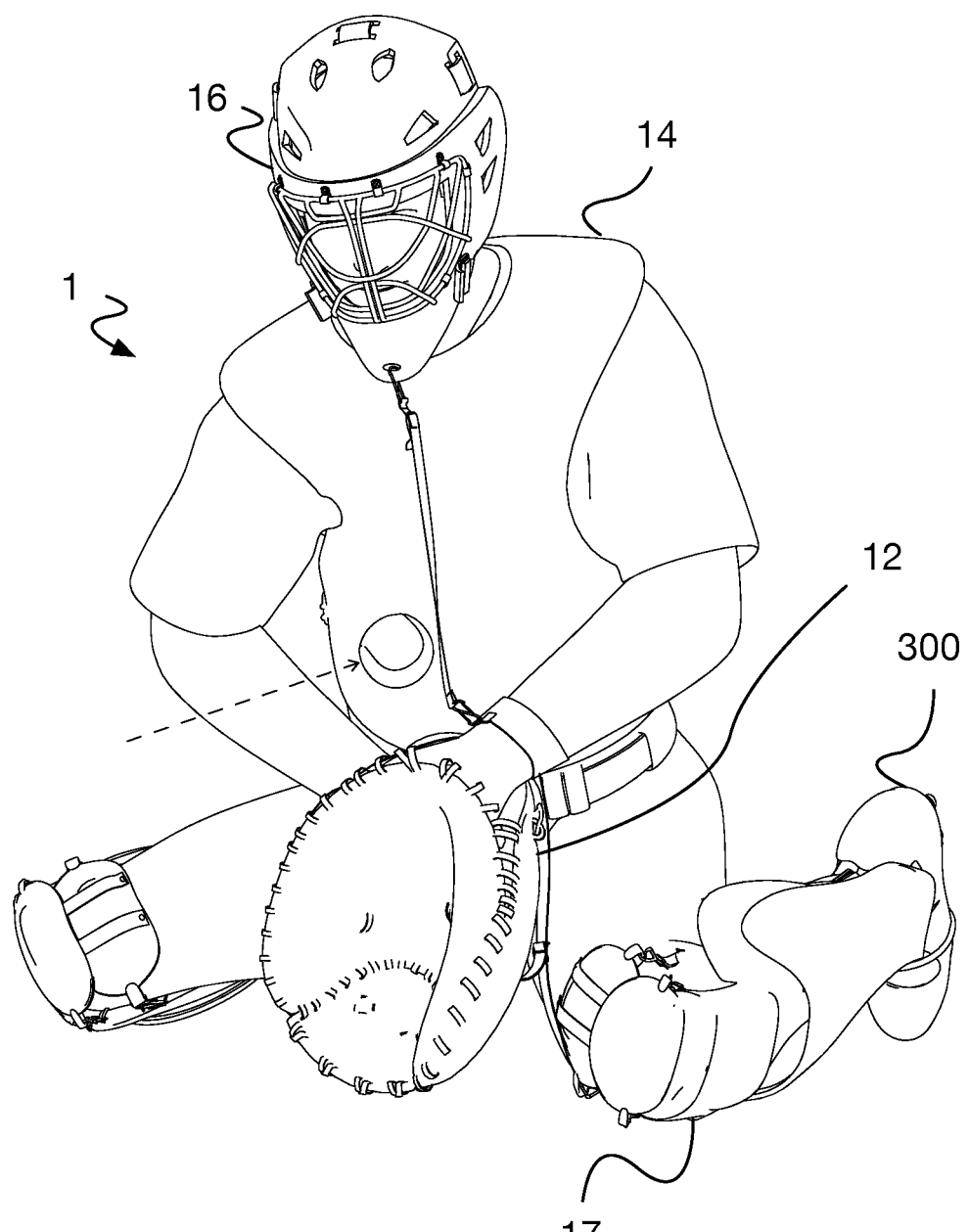
FIG. 14 is a perspective view of the catcher of FIG. 13 in a blocking position illustrating proper form.

FIG. 14 is a perspective view of the catcher of FIG. 13 in a blocking position illustrating proper form. Because the automatic tether retraction system 108 and/or the release trigger system 106 is locked, and because the catcher 1 has dropped its knees to the ground (which brings the left thigh down towards the ground) the catcher 1's left wrist is pulled down towards the ground and prevented from being moved up beyond any available slack. The catcher is now put in the proper form for the defensive position and prevented from easily getting out of this proper form. A person having ordinary skill in the art understands that this teaches the catcher 1 the muscle memory for the proper form.

Figure 15:
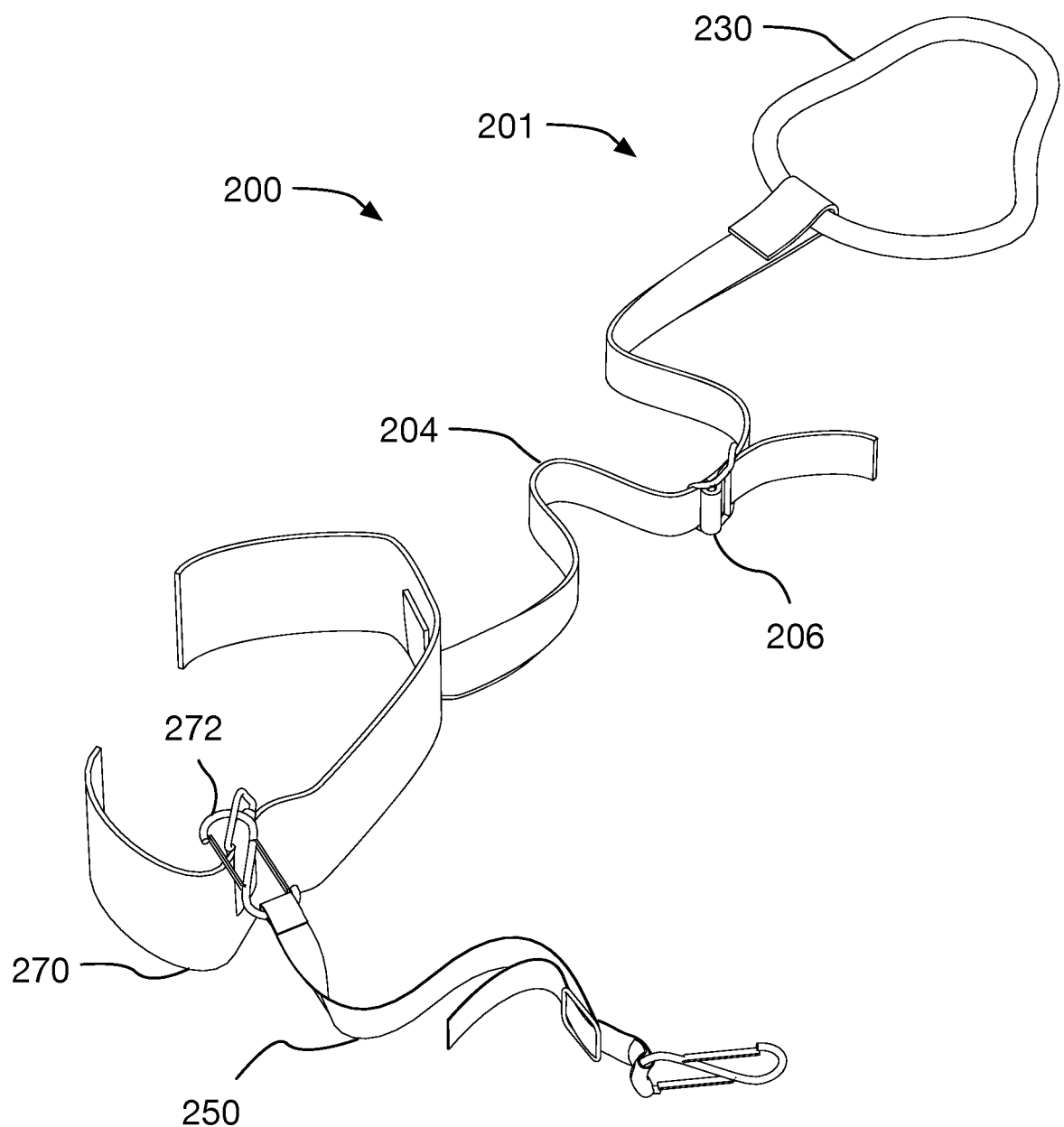
FIG. 15 is a perspective view of a second exemplary embodiment of a system for training a baseball catcher.
Figure 17:
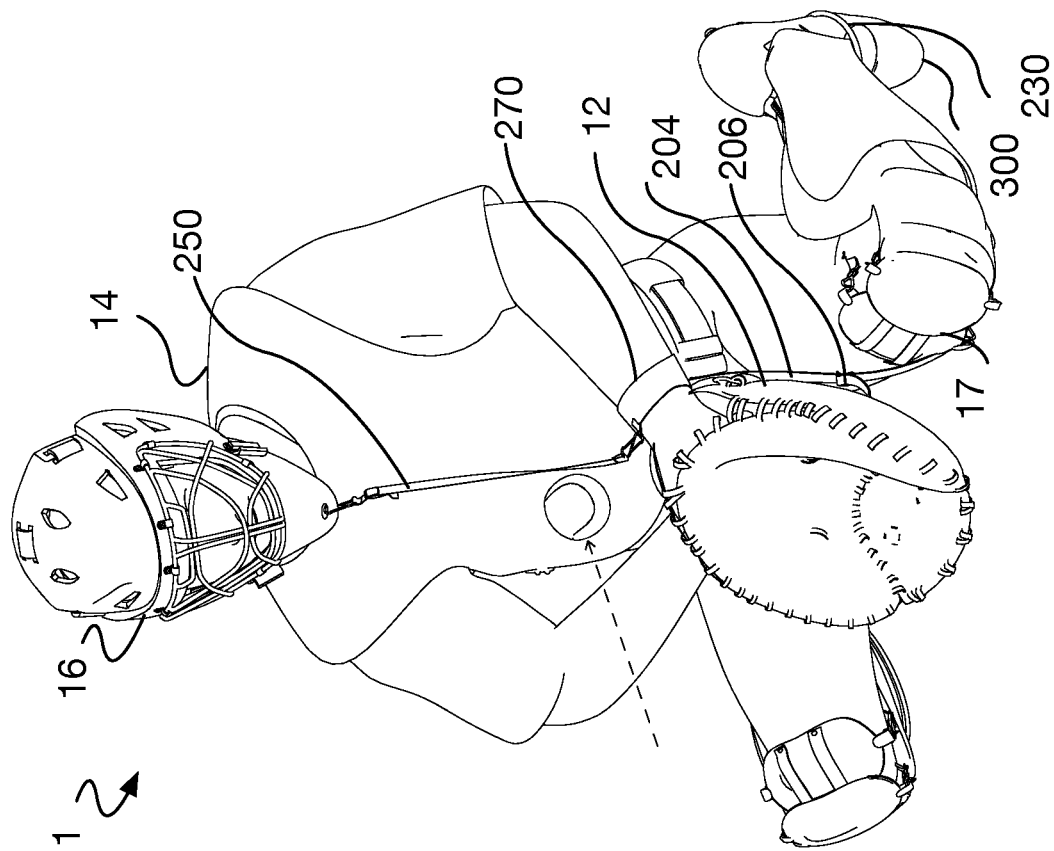
FIG. 17 is a perspective view of the catcher of FIG. 16 in a blocking position illustrating proper form.
Figure 16:
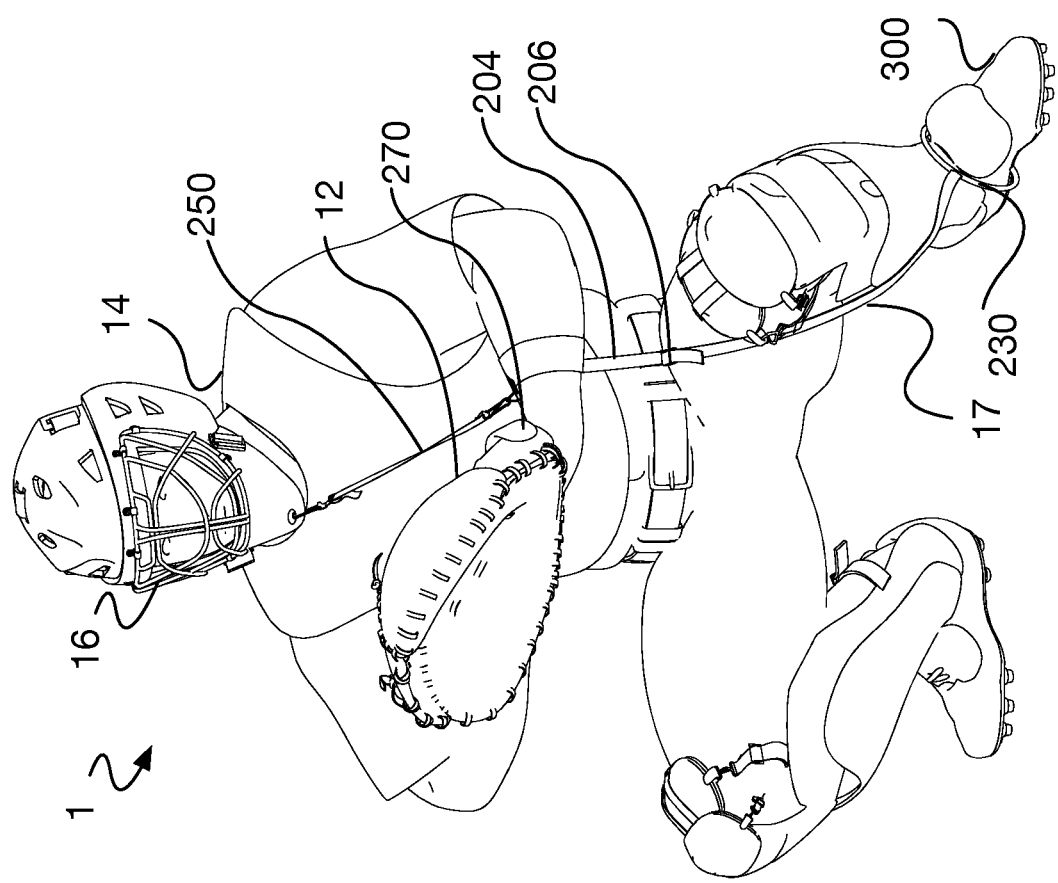
FIG. 16 is a perspective view of the catcher of FIGS. 1 and 2 in a standard catching position with the system for training a baseball catcher of FIG. 15 detachably engaged to the left foot, the left wrist, and the facemask of the catcher.

FIG. 15 is a perspective view of a second exemplary embodiment of a system for training a baseball catcher. FIG. 16 is a perspective view of the catcher of FIGS. 1 and 2 in a standard catching position with the system for training a baseball catcher of FIG. 15 detachably engaged to the left foot, the left wrist, and the facemask of the catcher. FIG. 17 is a perspective view of the catcher of FIG. 16 in a blocking position illustrating proper form. A system 200 comprises a second exemplary embodiment of a wrist-to-leg adjustable tether system 201, a second exemplary embodiment of a leg attachment component 230, a second exemplary embodiment of a wrist-to-facemask adjustable tether 250, and a second exemplary embodiment of a wrist strap 270. The system 200 has similar components with similar configurations and functions as the system for training a baseball catcher 100 of FIGS. 1-14 except for specific non-limiting differences described herein and below.

The wrist-to-leg adjustable tether system 201 comprises one exemplary embodiment of a nylon cord/strap 204 and an adjustment strap 206. In this particular embodiment, the leg attachment component 230 is a bungee foot/cleat loop. The nylon cord/strap 204 is configured to have its slack increased or decreased along the adjustment strap 206. The nylon card/stap 204 creates a static mechanical link between the wrist strap 270 and the bungee foot/cleat loop 230. The bungee foot/cleat loop 230 is a stretchable loop configured to go around the foot of the catcher 1.

In this way, when the bungee foot/cleat loop 230 is, for example, stretched around the cleat 300 of the catcher 1 and when the wrist strap 170 is detachably engaged to a catcher's 1 right wrist, the system 200 facilitates training the proper form for the traditional blocking position. More specifically, when a catcher 1 establishes the standard catching position (see FIG. 16), the adjustment strap 206, may be adjusted to lock and fix any maximum extendable length of nylon cord/strap 204 such that if the catcher 1 drops to its knees, out of the standard catching position, the catcher's 1 right wrist is pulled down towards the ground and prevented from being moved up beyond any available slack. Moreover, because of the mechanical link between the wrist-to-facemask adjustable tether 250 and the wrist strap 270, when a catcher 1 drops its knees out of the standard catching position, the catcher's 1 facemask is pulled down towards the ground and prevented from being moved up (see FIG. 17).

A person having ordinary skill in the art understands that when the bungee foot/cleat loop 230 and/or the nylon cord/strap 204 with adjustment strap 206 may have a configuration, structure, and mechanism that is more complex than the simple solution presented in the FIGS. Moreover, it is envisioned that the wrist-to-leg adjustable tether system 201 may have any suitable means for engaging to the foot, leg, wrist, or relevant equipment of the catcher 1 other than rubber/elastomeric materials. For example, it is envisioned that the leg attachment component 230 may attach directly to the cleat 300 via a carabiner. Moreover, it is envisioned that the wrist-to-leg adjustable tether system 201 may take any shape, structure, or design and may even involve other components or sub-components to form a fixed-length tether.

Furthermore, a person having ordinary skill in the art recognizes that a system for training a baseball catcher may be made of any material(s); however, a preferred embodiment of the a system for training a baseball catcher comprises easy to build and transport composite plastics or inexpensive synthetic materials. A person having ordinary skill in the art of manufacturing understands the intricacies and fine details of building and structuring a system for training a baseball catcher for various types of users.

Although the particular embodiments shown and described above will prove to be useful in many applications the baseball catcher training art to which the present invention pertains, further modifications of the present invention will occur to persons skilled in the art. All such modifications are deemed to be within the scope and spirit of the present invention as defined by the appended claims.

What is claimed is:

1. A system for training a baseball catcher, comprising:
   (A) a facemask configured for use by a baseball catcher;
   (B) a wrist strap configured to be secured around a wrist of the baseball catcher, the wrist being associated with a catcher's glove worn by the baseball catcher;
   (C) a wrist-to-facemask tether detachably engaged to the wrist strap at a first end and to the facemask at a second end, wherein the wrist-to-facemask tether is adjustable to a plurality of fixed lengths and is operable to maintain a fixed length between the wrist strap and the facemask;
   (D) a retractable tether detachably engaged, at a first end, to the wrist strap;
   (E) an automatic tether retraction system mechanically engaged to a second end of the retractable tether, the automatic tether retraction system configured to automatically retract and spool the retractable tether;
   (F) a release trigger system mechanically engaged to a portion of the retractable tether, the release trigger system configured to, at least in part, lock and prevent any extension of the spooled retractable tether when in a locked state;
   (G) a leg attachment component configured to be secured around a thigh of the baseball catcher and supporting, at least in part, the automatic tether retraction system and the release trigger system;
   wherein the retractable tether restricts the distance the wrist strap may range from the leg attachment component when the release trigger system is in the locked state; and
   wherein the wrist-to-facemask tether, by maintaining the fixed length between the wrist strap and the facemask, restricts the distance the facemask of the baseball catcher may range from the wrist strap such that when the leg attachment component is mounted to a thigh of the baseball catcher and the baseball catcher lowers his knees from a standard catching position the facemask is pulled down towards the ground and prevented from being moved up and away from the ground.

2. The system for training a baseball catcher of claim 1, wherein the retractable tether comprises a first length and a second length, the first length defined by a series of spaced stops along the surface, the spaced stops configured to, at least in part, lock with the release trigger system, when the release trigger system is in the locked state, to prevent any extension of the spooled retractable tether.

3. The system for training a baseball catcher of claim 2, wherein the release trigger system mechanically engages with the first length in a ratcheting action.

4. The system for training a baseball catcher of claim 1, wherein the automatic tether retraction system is pivotably and rotatably engaged to the leg attachment component via a surface feature defined on a housing for the automatic tether retraction system, the surface feature configured to receive a portion of leg attachment component.

5. A system for training a baseball catcher, comprising:
(A) a facemask configured for use by a baseball catcher;
(B) a wrist strap configured to be secured around a wrist of the baseball catcher, the wrist being associated with a catcher's glove worn by the baseball catcher;
(C) a wrist-to-facemask tether detachably engaged to the wrist strap at a first end and to the facemask at a second end, wherein the wrist-to-facemask tether is adjustable to a plurality of fixed lengths and is operable to maintain a fixed length between the wrist strap and the facemask;
(D) a retractable tether detachably engaged, at a first end, to the wrist strap;
(E) an automatic tether retraction system comprising a housing and internal mechanisms, the internal mechanisms engaged, at least in part, to a second end of the retractable tether and configured to automatically retract and spool the retractable tether into the housing;
(F) a release trigger system supported at least in part by the housing and mechanically engaged to a portion of the retractable tether, the release trigger system configured to, at least in part, lock and prevent any extension of the spooled retractable tether out of the housing when in a locked state;
(G) a leg attachment component configured to be secured around a thigh of the baseball catcher and supporting, at least in part, the housing;
wherein the retractable tether restricts the distance the wrist strap may range from the leg attachment component when the release trigger system is in the locked state; and
wherein the wrist-to-facemask tether, by maintaining the fixed length between the wrist strap and the facemask, restricts the distance the facemask of the baseball catcher may range from the wrist strap such that when the leg attachment component is mounted to a thigh of the baseball catcher and the baseball catcher lowers his knees from a standard catching position the facemask is pulled down towards the ground and prevented from being moved up and away from the ground.

6. The system for training a baseball catcher of claim 5, wherein the retractable tether comprises a first length and a second length, the first length defined by a series of spaced stops along the surface, the spaced stops configured to, at least in part, lock with the release trigger system, when the release trigger system is in the locked state, to prevent any extension of the spooled retractable tether out of the housing.

7. The system for training a baseball catcher of claim 6, wherein the release trigger system mechanically engages with the first length in a ratcheting action.

8. The system for training a baseball catcher of claim 5, wherein the housing of the automatic tether retraction system is pivotably and rotatably engaged to the leg attachment component via a surface feature defined on the housing, the surface feature configured to receive a portion of leg attachment component.

9. The system for training a baseball catcher of claim 5, wherein the housing of the automatic tether retraction system comprises two clam-shell halves defining an interior containing, at least in part, the internal mechanism and the spooled retractable tether, and defining a tether opening such that the retractable tether extends there through out of the housing.

10. The system for training a baseball catcher of claim 9, wherein the interior of the housing of the automatic tether retraction system also contains, at least in part, the release trigger system.

* * * * *